United States Patent [19]

Johnson

[11] Patent Number: 5,034,697

[45] Date of Patent: Jul. 23, 1991

[54] MAGNETIC AMPLIFIER SWITCH FOR AUTOMATIC TUNING OF VLF TRANSMITTING ANTENNA

[75] Inventor: Leopold J. Johnson, Valley Center, Calif.

[73] Assignee: United States of America as represented by the Secretary of the Navy

[21] Appl. No.: 364,405

[22] Filed: Jun. 9, 1989

[51] Int. Cl.$^5$ ............................................. H04B 1/02
[52] U.S. Cl. ..................................... 330/63; 455/121; 455/127
[58] Field of Search ................ 455/115, 116, 120, 125, 455/127, 130, 40, 41, 121; 343/701, 719, 787, 788, 895; 330/63; 323/356-359, 361

[56] References Cited

U.S. PATENT DOCUMENTS

| | | | |
|---|---|---|---|
| 2,504,967 | 4/1950 | Edinborgh | 455/121 |
| 3,162,869 | 12/1964 | Yax | 455/121 |
| 3,189,748 | 6/1965 | McMurray | 330/63 |
| 3,273,071 | 9/1966 | Jackson | 330/63 |
| 3,278,937 | 10/1966 | Leydorf . | |
| 3,739,291 | 6/1973 | Buchhold | 330/63 |
| 3,922,679 | 11/1975 | Campbell | 343/703 |
| 3,965,474 | 6/1976 | Guerrino et al. | 343/709 |
| 4,458,248 | 7/1984 | Lyasko | 343/719 |
| 4,521,913 | 6/1985 | Huber et al. | 455/121 |
| 4,843,634 | 6/1989 | Pike | 455/121 |

Primary Examiner—Curtis Kuntz
Attorney, Agent, or Firm—Harvey Fendelman; Thomas Glenn Keough

[57] ABSTRACT

A magnetic amplifier switch is connected to a transmitter and antenna of a VLF transmitting system. The transmitter is operable to produce a signal which is modulated to first and second frequencies, for example "mark" and "space" frequencies, at different times. The magnetic switch is connected with inductors which are also connected with the transmitter and antenna. Opening and closing of the magnetic amplifier switch changes the inductance of the antenna such that the antenna is automatically tuned to resonance at the one or the other of the modulated frequencies being transmitted at a given time.

12 Claims, 2 Drawing Sheets

MAGNETIC AMPLIFIER SWITCH FOR AUTOMATIC TUNING OF VLF TRANSMITTING ANTENNA

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention generally relates to tuning of antennas and, more particularly, to a magnetic amplifier switch for automatic tuning of a very low frequency (VLF) transmitting antenna.

High power VLF transmitters require large antenna systems to obtain any reasonable degree of radiation. Generally, antennas for transmitters are at least one quarter wavelength in dimension. Since the VLF band is 15 kHz to 30 kHz, a quarter wavelength would be 5000 to 2500 meters. Antennas of such great lengths (which also must be an equal distance from the ground plane) are not practical to build.

Therefore, antennas for VLF transmitters are made physically smaller and are reactively loaded to resonate at the desired frequency. The ratio of the reactive power to the real power driven into the antenna circuit (which has been tuned by reactance) is referred to as the "Q" factor. Usually the "Q" factor is greater than 250. In order to produce signal radiation at an acceptable efficiency, tuning the antenna to the exact transmitter frequency is desirable. Any error in tuning will cause a decrease in transmitted power and a reduction in transmitter efficiency, i.e., a decrease in the transmitted signal reception area.

Currently, in a VLF transmitting station the antenna is tuned to a desired center frequency. However, the transmitter is typically being operated to frequency modulate the radio frequency power exciting the antenna. This mode of transmitter operation causes a frequency error above and below the center frequency of the tuned antenna, resulting in lower transmitted power. Since VLF transmission is at very high power, typically more than a million watts, the lost power due to the frequency error is quite significant. The frequency modulation (called "mark" and "space" frequencies) is approximately one percent of the center (tuned) frequency. With an antenna "Q" factor of around 250, it can be shown that the power loss due to out-of-tuning can be as much as 4 decibels, or more than half of the power.

In view of the above-described drawback of the current VLF antenna tuning approach, there is a need for a different approach to reduce power loss and increase transmitter efficiency.

SUMMARY OF THE INVENTION

The present invention provides a magnetic amplifier switch designed to avoid the above-cited drawback and satisfy the aforementioned need. The magnetic amplifier switch when applied to a radio frequency transmitting system improves efficiency and reduces power loss of a transmitter by automatically tuning the antenna in real time to the exact operating frequency of the transmitter. In other words, the magnetic switch maintains antenna resonance at the instantaneous transmitted frequency and not, as heretofore, at a center frequency offset above or below the transmitted frequency which resulted in lower transmitted power.

In accordance with the present invention, the magnetic amplifier switch includes a power circuit, a control circuit, first and second magnetic cores, and a control device for selectively turning the control circuit either "on" or "off". The power circuit has first and second power windings and a plurality of current flow control devices in the form of steering diodes which permit current flow only through one of the power windings at a time and only in one direction through the power windings. The control circuit has first and second control windings and a plurality of current flow control devices. The current flow control devices in the form of steering diodes permit current flow only through one of the control windings at a time and only in a direction through the control windings being opposite to the one direction of current flow through the power windings. Also, the control circuit is capable of being turned either "on" or "off" so as to correspondingly either permit or prevent the current flow therein.

The first and second magnetic cores respectively inductively couple the first power winding with the first control winding and the second power winding with the second control winding. The magnetic cores are capable of being driven to saturation by current flow in the power windings when the control circuit is turned "off" and capable of being reset by the current flow in the control windings when the control circuit is turned "on".

Thus, actuation of the control device to turn the control circuit "on" results in alternately magnetizing the magnetic cores in one direction and then the opposite direction so as to reset the cores and prevent saturation thereof and thereby places the magnetic switch in an "open" switch configuration. On the other hand, actuation of the control device to turn the control circuit "off" results in saturation of the cores and thereby places the magnetic switch in a "closed" switch configuration.

Also, the magnetic amplifier switch and first and second inductors are provided in combination with a radio frequency transmitting system. The transmitting system includes a transmitter operable at a frequency which is modulated to first and second frequencies, for example "mark" and "space" frequencies, at different times and an antenna connected to the transmitter. The magnetic amplifier switch in cooperation with the first and second inductors is operable to automatically tune the antenna to resonance at one of the modulated frequencies of the transmitter being transmitted at a given time.

More particularly, the first inductor is connected with the antenna and with the first and second power windings and the current flow control devices of the power circuit for tuning the antenna to radiate an A.C. signal at the first frequency of the transmitter when the control circuit is turned "on", placing the magnetic switch in the "open" switch configuration. The second inductor is connected with the transmitter for receiving an A.C. signal therefrom and coupled with the first and second control windings and the current flow control devices of the control circuit for producing resetting of the magnetic cores when the control circuit is turned "on" and for tuning the antenna to radiate an A.C. signal at the second frequency of the transmitter when the control circuit is turned "off" placing the magnetic switch in the "closed" switch configuration.

Thus, selected actuation of the control device of the magnetic switch to turn the control circuit either "on" or "off" and thereby change the magnetic switch to either "open" or "closed" switch configuration effectuates tuning of the antenna to radiate the A.C. signal at either the first or second frequency of the transmitter by switching the first inductor either in or out of electrical connection with the antenna.

OBJECTS OF THE INVENTION

Accordingly, it is the primary object of the present invention to disclose a novel magnetic amplifier switch which provides automatic tuning of a VLF transmitting antenna.

Another object of the present invention is to disclose a novel magnetic amplifier switch which improves efficiency and reduces power loss of a VLF transmitter by automatically maintaining antenna resonance at the instantaneous transmitted frequency.

Still another object of the present invention is to disclose a novel magnetic amplifier switch which maintains the antenna tuned exactly to the "mark" and "space" frequencies of the transmitter as they occur.

A further object of the present invention is to disclose a novel magnetic amplifier switch which tunes the antenna to the "mark" and "space" frequencies by synchronously adjusting the antenna to resonance in real time, keeping the transmitter loading purely resistive.

A still further object of the present invention is to disclose a novel magnetic amplifier switch which permits transition from the "closed" to "open" switch configuration, or vice versa, with only a delay of one-half cycle of the carrier signal from the time of initiating control to the time of the resulting output response.

Yet another object of the present invention is to disclose a novel magnetic amplifier switch which automatically tunes the antenna by employing steering diodes and a saturable transformer to change the inductance of the antenna circuit.

Other objects, advantages and novel features of the invention will become apparent from the following detailed description of the invention when considered in conjunction with the accompanying drawings.

BRIEF DESCRIPTION OF THE DRAWINGS

FIG. 4 is a diagram of the hysteresis loop for magnetic cores employed by the magnetic amplifier switch of FIGS. 1 and 2.

DETAILED DESCRIPTION OF THE INVENTION

Figure 1:
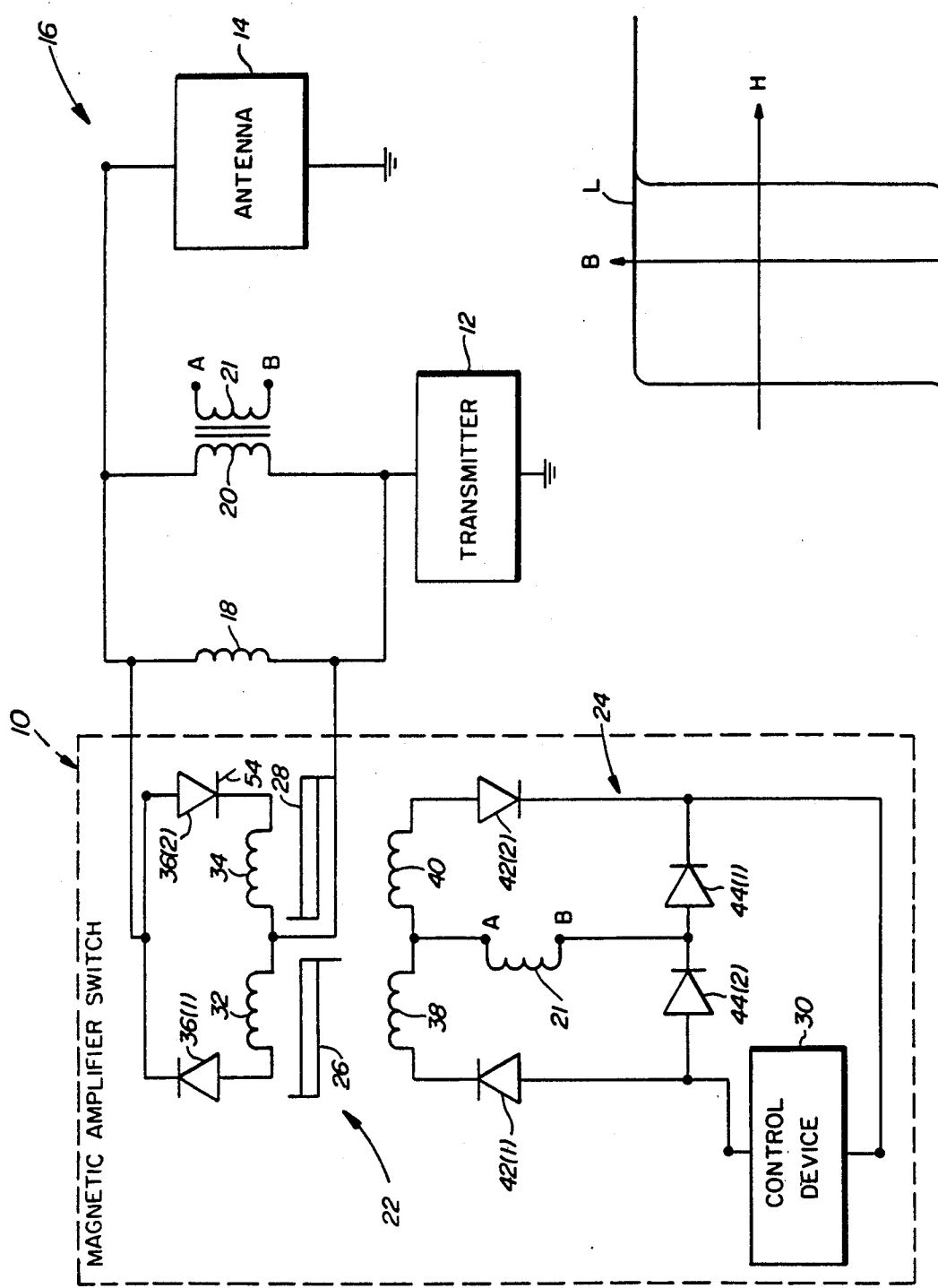
FIG. 1 is a schematic diagram of a magnetic amplifier switch of the present invention connected with the transmitter and antenna of a VLF transmitting system.

Referring now to the drawings, and particularly to FIG. 1, there is shown a magnetic amplifier switch of the present invention, generally designated 10, connected with transmitter 12 and antenna 14 of VLF transmitting system 16, being represented in a simplified block diagram form. Without automatic tuning provided by the present invention, antenna 14 is constructed to resonate at a given center or set frequency of transmitter 12 in the VLF band, for example, at 21.40 kHz. Modulation of the transmitter frequency with binary data produces mark and space frequencies above and below the set frequency, for example, at 21.45 and 21.35 kHz, respectively, which is off the tuned frequency of antenna 14. However, with automatic tuning provided by the present invention, antenna 14 will be tuned to the mark and space frequencies at the times such frequencies are being produced.

For accomplishing automatic tuning of antenna 14, inductors 18 and 20 (also seen in FIG. 2) are provided in VLF transmitting system 16 in addition to magnetic amplifier switch 10. Inductors 18 and 20 are connected between transmitter 12 and antenna 14 and in parallel with magnetic amplifier switch 10 so as to cooperate therewith to change the inductance of antenna 14 and thereby tune antenna 14 to a condition of resonance at one of the mark and space modulated frequencies to be transmitted by system 16 at a given time.

Figure 2:
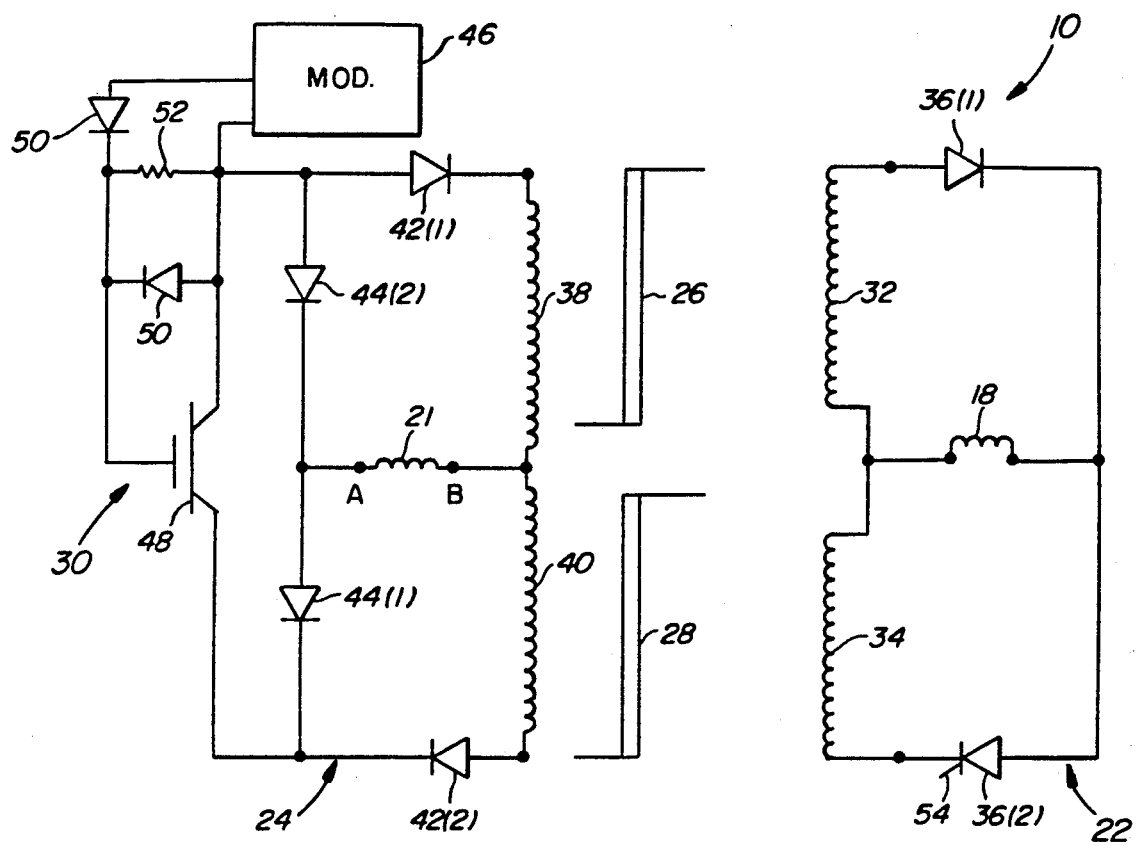
FIG. 2 is another schematic diagram of the magnetic amplifier switch connected to a modulator.

Referring to FIGS. 1 and 2, magnetic amplifier switch 10 includes power circuit 22, control circuit 24, and magnetic cores 26 and 28, and control device 30 for turning control circuit 24 "on" and "off". Power circuit 22 of switch 10 includes power windings 32 and 34 and a plurality of current flow control devices in the form of diode 36(1) and gate controlled (turn off) diode 36(2). Diode 36(1) and gate controlled diode 36(2) are oriented to steer or permit current flow only through one of the power windings 32 or 34 at a time and only in one direction through the power windings.

Control circuit 24 of switch 10 includes control windings 38 and 40 and a plurality of current flow control devices in the form of two pairs of diodes 42(1) and 42(2), and 44(1) and 44(2). The diodes steer or permit current flow only through one of the control windings 38 or 40 at a time and only in a direction through the control windings being opposite to the direction of current through power windings 32 and 34. Turning control circuit 24 either "on" or "off" by use of control device 30 correspondingly either permits or prevents current flow in control windings 38 and 40 of the control circuit.

Magnetic cores 26 and 28, respectively, inductively couple power winding 32 with control winding 38 and power winding 34 with control winding 40. Hysteresis loop L of a suitable material for use in magnetic cores 26, 28 is shown in FIG. 4. The use of diode 36(1) and gate controlled diode 36(2) allows magnetic cores 26 and 28 to be excited independently of each other. Thus, for instance, while power winding 32 is being excited, power winding 34 is blocked from being excited by its associated diode 36(2). Also, while power winding 34 is blocked from excitation, core 28 coupled therewith can be reset by current flow through control winding 40. At the same time control winding 38 coupled with excited power winding 32 is made inactive through blocking by its associated steering diode 42(1).

Therefore, sequentially, each half cycle of the transmitter A.C. voltage, diode 36(1) and gate controlled diode 36(2) control the direction of current flow so as to alternately excite power windings 32 and 34 and drive the flux of magnetic cores 26 and 28 to near saturation while at the same time diodes 42(1) and 42(2) control the direction of current flow so as to alternately excite control windings 38 and 40 and force the flux of the magnetic cores 26 and 28 to reset. So long as control windings 38 and 40 continue to be excited, magnetic cores 26 and 28 never reach saturation and magnetic switch 10 remains in an "open" switch configuration wherein high levels of current are not allowed to flow through power windings 32 and 34.

If control circuit 24 is turned "off", then the continued excitation of power windings 32 and 34 of power circuit 24 drives magnetic cores 26 and 28 to flux saturation due the inability of control circuit 24 to now reset the cores. Magnetic switch 10 is now converted or changed to a "closed" switch configuration wherein high levels of current can flow through the power windings and produce full current output.

Inductor 18 of transmitting system 16 is connected in series between transmitter 12 and antenna 14 and in parallel with power windings 32 and 34 and diodes 36(1) and 36(2) of power circuit 22. When control circuit 24 is turned "on" and thus magnetic switch 10 is in its "open" switch configuration, inductor 18 is electrically connected with antenna 14 for tuning antenna 14 to resonance at the lower space frequency and thus radiate an A.C. signal at such frequency. On the other hand, when control circuit 24 is turned "off" and thus magnetic switch 10 is placed in its "closed" switch configuration, inductor 18 is shorted-out by switch 10 and is electrically disconnected from antenna 14.

Inductor 20 of transmitting system 16 is connected in parallel with inductor 18. It is also connected in series between transmitter 12 and antenna 14 and is inductively coupled with inductor 21 which is connected across terminals A and B connected respectively between control windings 38 and 40 and diodes 44(1) and 44(2) of control circuit 24. When control circuit 24 is turned "on" and thus magnetic switch 10 is placed in its "open" switch configuration, inductor 20 produces resetting of magnetic cores 26, 28. On the other hand, when control circuit 24 is turned "off" and thus magnetic switch 10 is in its "closed" switch configuration, inductor 20 is electrically connected to antenna 14 but is shorted by the "closed" magnetic amplifier 22. The antenna 14 self-inductance then serves to tune the antenna to resonance at the higher mark frequency and radiate an A.C. signal at such frequency.

Control device 30 for turning control circuit 24 "on" and "off" thus effectuates tuning of antenna 14 to resonance at either the higher mark or lower space frequency to thereby radiate an A.C. signal at either such frequency. In other words, such tuning is achieved through switching inductor 18 in and out of electrical connection with antenna 14 by turning control circuit 24 "off" and "on", respectively.

Figure 3:
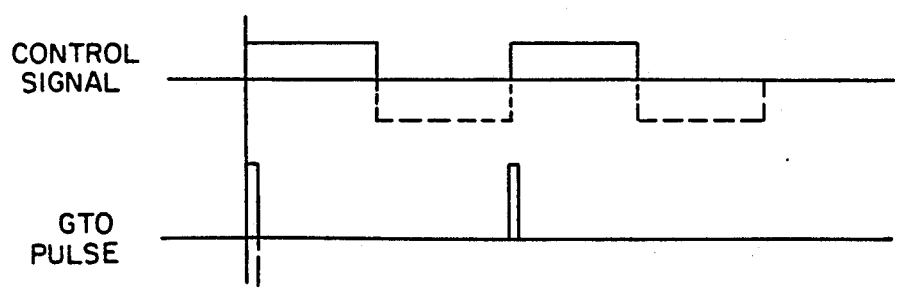
FIG. 3 is a diagram of the signals which initiate transition of the magnetic switch between "open" and "closed" switch configurations.

As shown in FIG. 2, control device 30 includes modulator 46 and switch device 48 in the form of an n-type FET transistor connected between modulator 46 and control circuit 24. Also, current flow blocking diodes 50 and resistor 52 are provided to isolate modulator 46 from current flowing in control circuit 24. Modulator 46 provides a binary data D.C. signal (i.e. identified by the caption "control signal" in FIG. 3) for both modulating the A.C. signal from transmitter 12 and for switching switch device 48 between conductive and non-conductive states for correspondingly turning control circuit 24 "on" and "off". The signal of modulator 46 is also connected to turn off gate 54 in the gate controlled diode 36(2) of power circuit 22. Typical signal waveforms applied to switch device 48 and turn off gate 54 of gated controlled diode 36(2) are depicted in FIG. 3. Application of the gate turn off (GTO) pulse of FIG. 3 to the gate controlled diode 36(2), which occurs on the positive going edge of the modulator output (control signal), renders diode 36(2) non-conductive momentarily, i.e., for one-half cycle, as control circuit 24 is being turned "on". This half-cycle interruption of the current flow in power circuit 22 permits changing or transition of magnetic switch 10 to its "open" switch configuration, permitting resetting of magnetic cores 26 and 28 by renewed current flow in control windings 38 and 40 of control circuit 24.

It should be apparent that magnetic amplifier switch 10 thus has only a half-cycle delay from initiating control to the output response, that is, making a transition from "closed" to "open" switch condition, or vice versa. The use of the steering diodes with the saturable magnetic cores eliminates the need for matching the "on" switch current (high current flowing in power circuit 22) with equal control current. Rather, the control current need be no more than that current which magnetized the cores initially.

It is thought that the present invention and many of its attendant advantages will be understood from the foregoing description and it will be apparent that various changes may be made in the form, construction and arrangement of the parts thereof without departing from the spirit and scope of the invention or sacrificing all of its material advantages, the forms hereinbefore described being merely exemplary embodiments thereof.

Having thus described the invention, what is claimed is:

1. A magnetic amplifier switching network, comprising:
    a power circuit having first and second power windings and means for controlling current flow so as to permit current flow only through one of said power windings at a time and only in one direction therethrough;
    a control circuit operably coupled to said power circuit having first and second control windings and means for controlling current flow so as to permit current flow only through one of said control windings at a time and only in a direction therethrough opposite to said direction of current flow through said power windings, said control circuit being capable of being turned either "on" or "off" so as to correspondingly either permit or prevent said current flow therein;
    first and second magnetic cores respectively inductively coupling said first power winding with said first control winding and said second power winding with said second control winding, said magnetic cores capable of being driven to saturation by current flow in said power windings when said control circuit is turned "off" and capable of being reset by current flow in said control windings when said control circuit is turned "on"; and
    a control device connected to said control circuit and being actuatable for selectively turning said control circuit either "on" or "off" to respectively place said magnetic amplifier switching network in either "open" or "closed" switch configurations.

2. The network of claim 1 wherein said current flow controlling means of said power circuit is a plurality of steering diodes.

3. The network of claim 1 wherein control device is also connected to said current flow controlling means of said power circuit for rendering said means non-conductive momentarily when said control circuit is turned "on" in order to interrupt current flow in said power circuit and permit resetting of said magnetic cores by current flow in said control circuit.

4. The network of claim 1 wherein said current flow controlling means of said control circuit is a plurality of steering diodes.

5. The network of claim 1 wherein said control device is a transistor.

6. In a radio frequency transmitting system including a transmitter operable to generate an A.C. signal at a frequency which is modulated to produce first and second frequencies at different times and an antenna connected to said transmitter, the combination comprising:
   (a) a magnetic amplifier switch for automatic tuning of said antenna to the one said first and second frequencies being transmitted at a given time, said magnetic switch including:
      (i) a power circuit having first and second power windings and means for controlling current flow so as to permit current flow only through one of said power windings at a time and only in one direction therethrough;
      (ii) a control circuit operably coupled to said power circuit having first and second control windings and means for controlling current flow so as to permit current flow only through one of said control windings at a time and only in a direction therethrough being opposite to the one direction of current flow through said power windings, said control circuit capable of being turned either "on" or "off" so as to respectively either permit or prevent said current flow therein; and
      (iii) first and second magnetic cores respectively inductively coupling said first power winding with said first control winding and said second power winding with said second control windings, said magnetic cores capable of being driven to saturation by current flow in said power windings when said control circuit is turned "off" and capable of being reset by said current flow in said control windings when said control circuit is turned "on";
   (b) a first inductor connected between said transmitter and antenna and with said first and second power windings and said current flow controlling means of said power circuit for tuning said antenna to resonance, and to radiate an A.C. signal, at said first frequency when said control circuit is turned "on"; and
   (c) a second inductor connected between said transmitter and said antenna and with said first and second control windings and said current flow controlling means of said control circuit for producing resetting of said magnetic cores when said control circuit is turned "on" and for tuning said antenna to resonance, and to radiate an A.C. signal, at said second frequency when said control circuit is turned "off".

7. The system of claim 6 wherein said current flow controlling means of said power circuit is a plurality of steering diodes.

8. The system of claim 6 wherein control device is also connected to said current flow controlling means of said power circuit for rendering said means non-conductive momentarily when said control circuit is turned "on" in order to interrupt current flow in said power circuit and permit resetting of said magnetic cores by current flow in said control circuit.

9. The system of claim 6 wherein said current flow controlling means of said control circuit is a plurality of steering diodes.

10. The system of claim 6 wherein said control device is a transistor.

11. The system of claim 6 further comprising means for generating signals for actuating said control device to turn said control circuit "on" or "off".

12. The system of claim 11 wherein said signal generating means is a modulator.

* * * * *